United States Patent
Stingl et al.

(10) Patent No.: US 8,018,979 B2
(45) Date of Patent: Sep. 13, 2011

(54) MODE-LOCKED SHORT PULSE LASER RESONATOR AND SHORT PULSE LASER ARRANGEMENT

(75) Inventors: Andreas Stingl, Vienna (AT); Harald Frei, Jetzelsdorf (AT); Christian Warmuth, Kierling (AT)

(73) Assignee: Femtolasers Produktions GmbH (AT)

( * ) Notice: Subject to any disclaimer, the term of this patent is extended or adjusted under 35 U.S.C. 154(b) by 0 days.

(21) Appl. No.: 11/867,446

(22) Filed: Oct. 4, 2007

(65) Prior Publication Data

US 2009/0092167 A1 Apr. 9, 2009

(51) Int. Cl.
*H01S 3/098* (2006.01)

(52) U.S. Cl. ............... 372/18; 372/13; 372/10; 372/93; 372/94

(58) Field of Classification Search .............. 372/18, 372/13, 10, 93, 94
See application file for complete search history.

(56) References Cited

U.S. PATENT DOCUMENTS

| | | | |
|---|---|---|---|
| 3,722,609 A | | 3/1973 | Kern et al. |
| 3,772,609 A | | 11/1973 | Willett et al. |
| 5,043,996 A | * | 8/1991 | Nilsson et al. ............... 372/94 |
| 5,079,722 A | | 1/1992 | Ogawa |
| 5,079,772 A | | 1/1992 | Negus et al. |
| 6,724,788 B1 | | 4/2004 | Holzwarth et al. |
| 6,785,303 B1 | | 8/2004 | Holzwarth et al. |
| 7,172,588 B2 | | 2/2007 | Stingl et al. |
| 7,190,705 B2 | * | 3/2007 | Fermann et al. ............... 372/18 |
| 2004/0017833 A1 | * | 1/2004 | Cundiff et al. ............... 372/18 |
| 2005/0254535 A1 | * | 11/2005 | Loewen et al. ............... 372/32 |
| 2007/0086713 A1 | * | 4/2007 | Ingmar et al. ............... 385/122 |
| 2007/0263681 A1 | * | 11/2007 | Yoshitomi et al. ............. 372/25 |

OTHER PUBLICATIONS

International Search Report and Written Opinion mailed Dec. 23, 2008 in related PCT International Application No. PCT/AT2008/000335.

A. Leitenstorfer et al., "Widely tunable two-color mode-locked Ti:sapphire laser with pulse jitter of less than 2 fs," Optics Letters, vol. 20, No. 8, pp. 916-198, Apr. 15, 1995.

D. E. Spence et al., "Femtosecond pulse generation by a dispersion-compensated, coupled-cavity, mode-locked Ti:sapphire laser," Journal of the Optical Society of America B, vol. 8, No. 10, pp. 2053-2060, Oct. 1991.

Thomas R. Schibli et al., "Toward Single-Cycle Laser Systems," IEEE Journal of Selected Topics in Quantum Electronics, vol. 9, No. 4, pp. 990-1001, Jul./Aug. 2003.

Takao Fuji et al., "Attosecond control of optical waveforms," New Journal of Physics, vol. 7, No. 116, pp. 1-9, 2005.

Florian W. Helbing et al., "Carrier-Envelope Offset Phase-Locking with Attosecond Timing Jitter," IEEE Journal of Selected Topics in Quantum Electronics, vol. 9, No. 4, pp. 1030-1040, Jul./Aug. 2003.

* cited by examiner

*Primary Examiner* — Jessica T Stultz
*Assistant Examiner* — Kinam Park
(74) *Attorney, Agent, or Firm* — Ostrolenk Faber LLP

(57) ABSTRACT

A mode-locked short pulse laser resonator including a pump laser beam input, a non-linear laser medium, a plurality of resonator mirrors as well as a first outcoupler mirror and a second outcoupler mirror, wherein the first outcoupler mirror is arranged for coupling out laser radiation having first spectral properties, and the second outcoupler mirror is arranged for coupling out laser radiation having second spectral properties which are different from the first spectral properties.

19 Claims, 6 Drawing Sheets

MODE-LOCKED SHORT PULSE LASER RESONATOR AND SHORT PULSE LASER ARRANGEMENT

FIELD OF THE INVENTION

The invention concerns a mode-locked short pulse laser resonator including a pump laser beam input, a laser crystal as well as mirrors, as e.g. at least a first end mirror and a second end mirror in case of a linear resonator or a plurality of cavity mirrors in case of a ring resonator. Preferably, the laser crystal is a non-linear laser gain medium.

Furthermore, the invention refers to a short pulse laser arrangement including such a mode-locked short pulse laser resonator as well as a CEP (CEP—Carrier Envelope Phase) stabilization device coupled to the short pulse laser resonator for phase locking the laser radiation.

BACKGROUND OF THE INVENTION

Mode-locked short pulse laser resonators (oscillators), in particular femtosecond laser resonators, are well known in the art, cf. for instance U.S. Pat. No. 5,079,772 A. The laser radiation generated by such laser resonators is a broad-band radiation, for instance in a wavelength range of about 650 nm to about 1050 nm. It is also known to use laser amplifiers in combination with such laser resonators, and such a laser amplifier is, for instance, disclosed in D. Strickland, G. Mourou, "Compression of amplified chirped optical pulses", Optics Communications, 55 (6), 15 Oct. 1985, p. 447-449, the disclosure of which being incorporated herein by reference. One problem encountered with such mode-locked short pulse laser resonators is the stabilization of phase and frequency, and such stabilization concepts are dealt with in U.S. Pat. No. 6,785,303 B1 as well as in U.S. Pat. No. 6,724,788 B1. In particular, for phase matching, separate, relatively complicated interferometer-type units are suggested.

On the other hand, U.S. Pat. No. 3,772,609 A proposes a laser cavity configuration having a dual output system. More in detail, there is disclosed a laser with two output coupling mirrors in connection with a laser cavity structure containing an active laser medium and producing two distinct laser frequencies (wavelengths). One end mirror is highly reflective at the first of these two wavelengths, and is partially transmissive at the second wavelength; the other end mirror is highly reflective at the second wavelength, and is partially transmissive at the first of the two wavelengths. Accordingly, the first mirror is arranged to couple out a laser beam having the second wavelength, and to reflect the first wavelength, whereas the second mirror is arranged to couple out the first wavelength and to reflect the second wavelength. The basis for the generation of such two laser wavelengths is that the laser cavity, for instance a plasma tube having Brewster's windows as end mirrors generates such two discrete laser wavelengths. The different laser wavelengths may be used for different purposes, and this without switching over the laser resonator from one mode of operation to another.

Contrary to such a dual frequency laser system, a usual mode-locked short pulse laser resonator produces broad-band laser radiation, as mentioned above. Nevertheless, there are applications conceivable where laser radiation with different properties would be useful, and where it is desirable not to have to switch over from one mode of operation to another, as for instance at the laser arrangement disclosed in U.S. Pat. No. 7,172,588 B2, where it is possible to use a short pulse mode of operation in which laser radiation having a lower power is generated in comparison with another short pulse mode of operation. In particular, it would be desirable to use laser radiation with different properties in a laser arrangement with a phase stabilization device, and in particular in a laser arrangement having coupled a laser amplifier to a resonator.

SUMMARY OF THE INVENTION

It is therefore an object of the present invention to provide a mode-locked short pulse laser resonator as well as a short pulse laser arrangement including such a mode-locked short pulse laser resonator where laser radiation with different properties may be obtained immediately, and with little effort as to construction, without switching over the laser resonator from one mode of operation to another.

According to another object of the invention, it is intended to provide laser means where it is possible to simultaneously output laser radiation with different spectral properties to feed such laser radiation to phase stabilization means of the laser on the one hand, and to a short pulse laser amplifier on the other hand.

According to the invention, a mode-locked short pulse laser resonator is provided which includes a pump laser beam input, a laser medium, preferably a non-linear laser medium, as for instance a Ti:Sapphire (Ti:Al$_2$O$_3$) crystal, as well as resonator mirrors; in particular, the oscillator comprises two outcoupler mirrors for coupling out laser radiation, a first of these outcoupler mirrors being arranged to couple out laser radiation having first spectral properties whereas the second outcoupler mirror is arranged for coupling out laser radiation having second spectral properties which are different from the first spectral properties. For instance, different spectral portions of the laser radiation of the resonator may be coupled out via the two outcoupler mirrors; further, it would be possible to couple out radiation of different bandwidths, nevertheless with the same center wavelengths, with different and/or equal power; or radiation portions with different center wavelengths, with spectra having different or equal bandwidths, and having different or equal power. This can be accomplished by choosing suitable outcoupler mirrors, with specific transmission and spectral density properties which depend on the layer structure of such mirrors, as is known per se.

In particular, laser radiation coupled-out at the first outcoupler mirror can be supplied to a CEP stabilization device, such a device being principally known per se, to provide for phase stabilization for the mode-locked short pulse laser resonator. In particular, this CEP stabilization device comprises difference frequency generator (DFG) means or f:2f interferometer means as an input stage, and the first end mirror supplies the laser radiation having first spectral properties to these DFG (or interferometer) means of the CEP stabilization device. Here, it would be useful to have relatively broad band laser radiation supplied to the CEP stabilization device, and a laser radiation of relatively low power; contrary to this, the laser radiation coupled out at the second end mirror should be a radiation having a relatively narrow bandwidth but relatively high power, and such laser radiation could be supplied to a laser amplifier as seeding laser radiation, as is in principle known per se.

Accordingly, the present invention also provides a short pulse laser arrangement including a mode-locked short pulse laser resonator as discussed above in combination with a CEP stabilization device coupled to the first outcoupler mirror for receiving laser radiation with first spectral properties, and in combination with a laser amplifier receiving laser radiation having second spectral properties from the second outcoupler mirror.

For instance, the relatively low power of the first laser radiation, which is coupled out via the first end mirror is such that the spectral density is less than 1 mW/nm. Contrary to this, the laser radiation coupled out via the second end mirror and having relatively high power when compared to the first laser radiation has a spectral density of more than 1 mW/nm.

Another range of applications of the invention benefits from the perfect synchronism of the output pulses. Due to the fact that both output pulses are generated in the same laser resonator, although they are different in bandwidth, center-wavelength and/or pulse duration, they are still perfectly synchronized. Two independent resonators, synchronized to each other, would be an alternative. Although different stabilization systems are available, synchronizing requires two laser resonators instead of one and an additional locking electronics. The resulting jitter between two such synchronized resonators will never be equal zero. In contrast, from a resonator described herein, it can be assumed that its pulses will have no or an extremely small timing jitter, compared to pulses generated in two different resonators. An example for the application of such synchronized pulses is for instance the Fourier transform coherent anti-Stokes Raman scattering (CARS), cf. Meng Cui et al, "Interferometric Fourier transform coherent anti-Stokes Raman scattering", Optics Express, 4 Sep. 2006, Vol. 14, No. 18, p. 8448-8458.

BRIEF DESCRIPTION OF THE DRAWING

Further details and advantages of the present invention will clearly appear from the following description which is given in connection with the accompanying drawings, wherein.

DETAILED DESCRIPTION OF THE PREFERRED EMBODIMENTS

Figure 1:
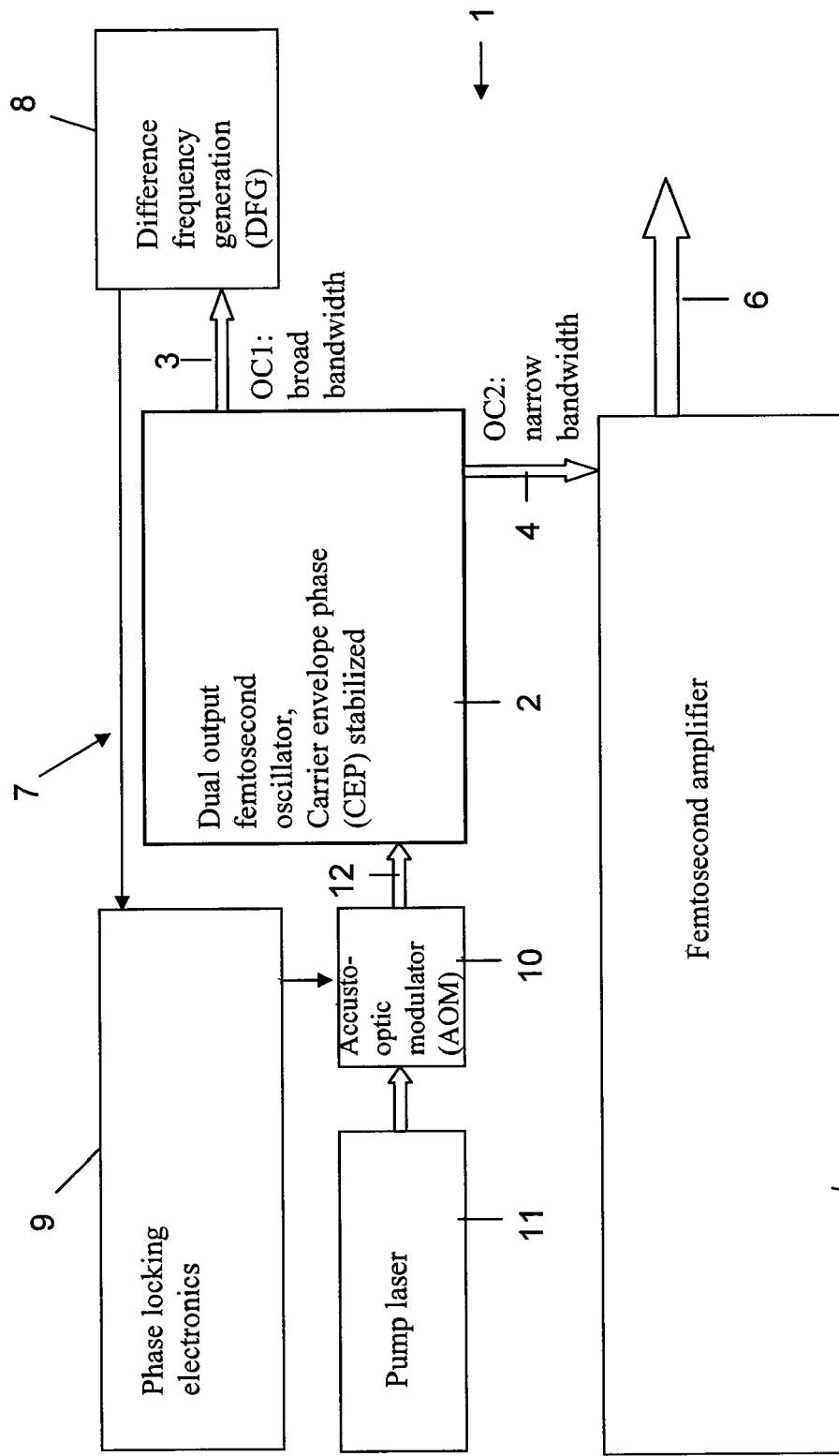
FIGS. 1 and 2 show similar schematic diagrams of two embodiments of a short pulse laser arrangement according to the invention comprising a mode-locked laser resonator, a laser amplifier, and a CEP stabilization device with a DFG input stage (FIG. 1), and with an interferometer input stage (FIG. 2), respectively.
Figure 2:
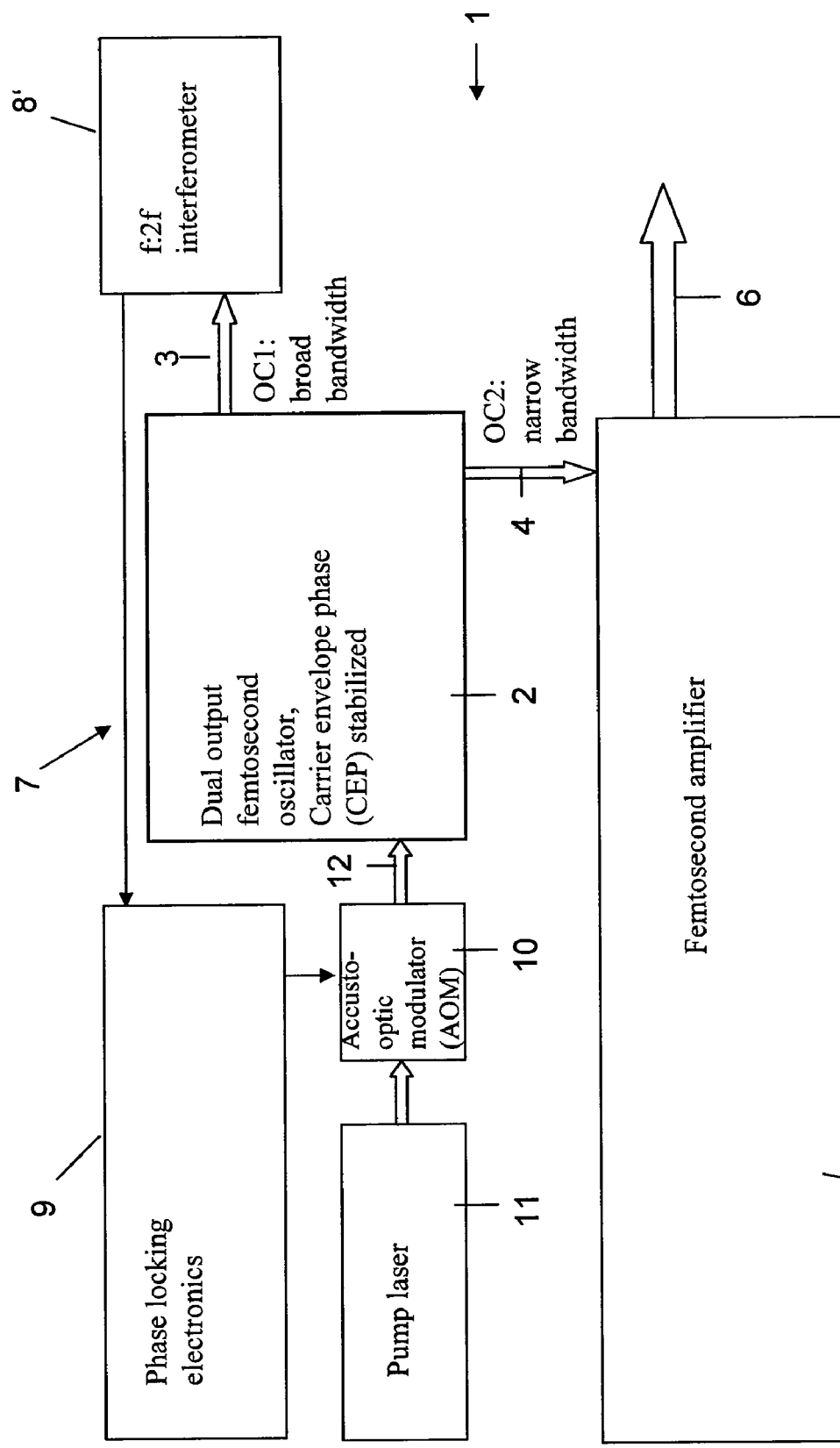

In FIGS. 1 and 2, a short pulse laser arrangement 1 is shown which includes a dual output femtosecond oscillator 2, that is a mode-locked short pulse laser resonator, in particular as shown in FIG. 2. This laser resonator or oscillator, in the following also shortly referred to as resonator 2, has a first output 3 for laser radiation having a relatively broad bandwidth, and a second output 4 for laser radiation having a relatively narrow bandwidth, when compared with the first output 3. For instance, the laser radiation at first output 3 has a pulse rate of 80 MHz, and a pulse energy of 1.4 nJ, and about 5% of the laser radiation oscillating in the resonator 2 is coupled out. At the second output 4, again, the laser radiation may have a pulse rate of 80 MHz but now a pulse energy of about 6 nJ, and this laser pulses are used for seeding a laser amplifier 5 of a structure known per se. At the output 6 of this laser amplifier, laser radiation with a pulse rate of 1-10 KHz is obtained, and with a pulse energy in the order of some mJ, for instance 1-5 mJ. This laser amplifier 5, thus, has the function to amplify the supplied laser pulses to obtain higher pulse energy.

The first output 3 of the laser resonator 2 is coupled to a carrier-envelope phase stabilization device 7, hereinafter in short CEP stabilization device or even shorter CEP device 7. This CEP device 7 includes an input stage, namely difference frequency generation (in short DFG) means 8 (FIG. 1), or f:2f interferometer means 8' (FIG. 2); this input stage 8, or 8', respectively, has its input coupled to the first output 3 of the resonator 2, and provides e.g. a difference frequency output to phase locking electronics 9. The latter serves for generating a control signal which is supplied to an accusto-optic modulator (AOM) 10 which is used for modulating the intra-cavity pulse energy and thus the optical path within a non-linear gain medium of the resonator 2, to be described below, via the optical Kerr effect, as is known per se.

More in detail, a pump laser (a continuous wave (cw)-laser), for instance a frequency-doubled single frequency Nd:YVO$_4$ laser (as for instance the "Coherent Verdi" laser) is used to supply pump laser radiation at a single frequency to the fs (fs—femtosecond) resonator 2 via the AOM unit 10.

Figure 3:
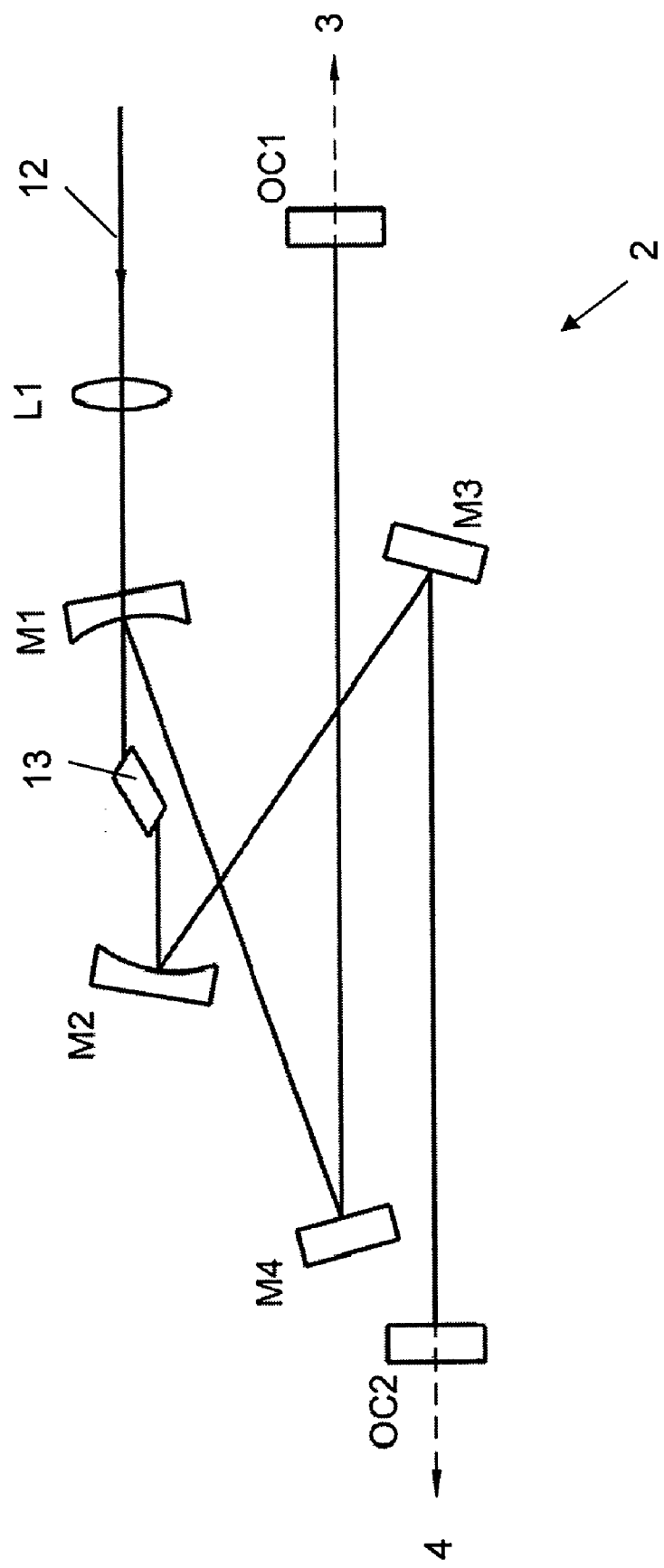
FIGS. 3 and 4 schematically show preferred embodiments for a structure of a short pulse laser resonator to which a pump laser radiation is supplied, namely with a folded structure (FIG. 3), and with a ring structure (FIG. 4), respectively.
Figure 4:
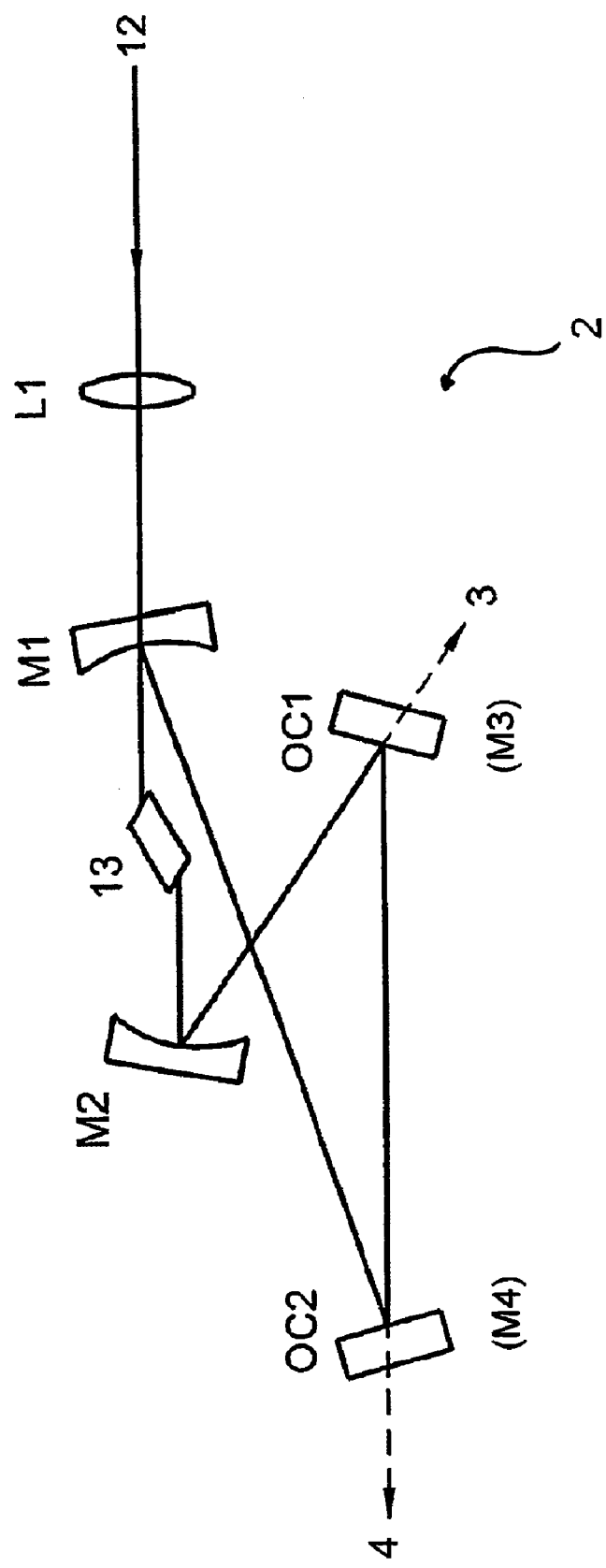

According to FIGS. 3 and 4, the oscillator 2 receives the pump laser beam at 12 which is supplied to an active laser medium (so-called gain medium), for instance in the form of a nonlinear Ti:Al$_2$O$_3$ crystal (Ti:Sapphire crystal) 13, namely via a lens L1 and a concave dichroic mirror M1 which is apt to transmit a laser pump beam but to reflect the laser pulses built up in the resonator 2 (according to the well-known Kerr lens mode-locking effect). Further, according to FIG. 3, mirrors M2, M3 and M4 are used to provide the laser resonator 2, and these mirrors M may be so-called chirped mirrors. Two separate end mirrors OC1 and OC2 are provided for the resonator 2, and at these end mirrors OC1, OC2, respective portions of the laser radiation are coupled out, for instance 5% at the end mirror OC1 and 29% at the end mirror OC2. Thus, end mirror OC1 forms the first output 3 whereas end mirror OC2 forms the second output 4. The term "OC" is usually used for referring to such outcoupler mirrors (OC—outcoupler). In the embodiment of FIG. 4, where a ring oscillator is shown as resonator 2, mirrors M3 and M4 are the outcoupler mirrors OC1, OC2.

The outcoupler mirrors OC1, OC2 may be simple Bragg multilayer mirrors according the structure: substrate+(HL)$^n$, where H refers to layers having a high reflection index, whereas L refers to layers having a low reflection index. For instance, the H layers comprise TiO$_2$ with an optic thickness of λ/4 at a wavelength of 800 nm whereas L layers are SiO$_2$ layers with the same optic thickness of λ/4 at 800 nm. n is the number of layers, and accordingly, the number of periods which is dependent on the transmission properties. For instance, for a transmission T=5%, n=5, this means that the end mirror (first outcoupler mirror OC1) has the structure: substrate+(HLHLHLHLHL) whereas for a transmission T=29%, n=3, this means that the end mirror (second outcoupler mirror OC2) has the structure:

substrate+(HLHLHL).

It should be clear that the above values for the transmission percentages, for the wavelengths and the number of layers are mere examples, and that other values could be appropriate for other embodiments.

Figure 5:
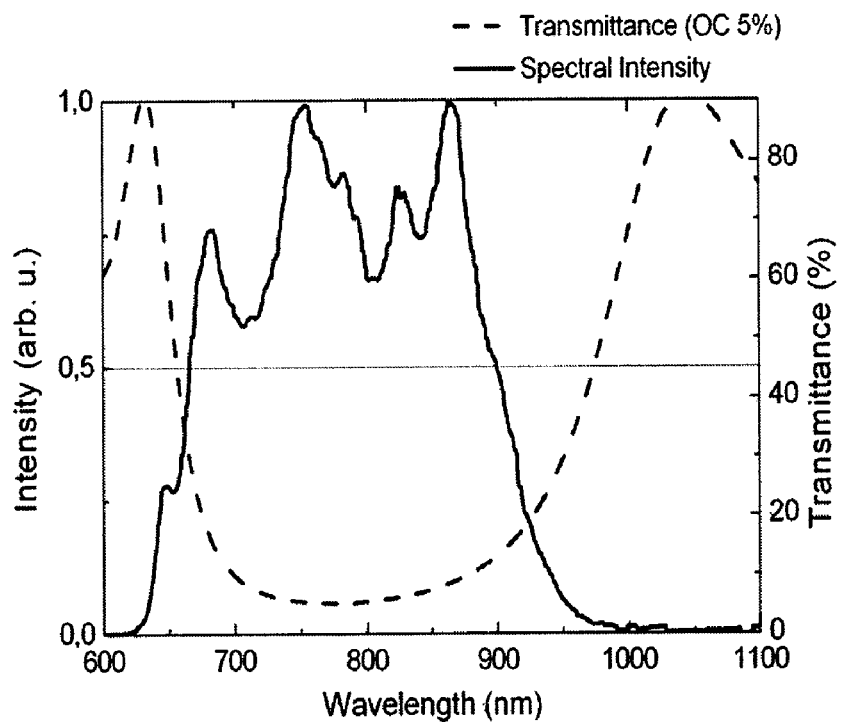
FIG. 5 shows a diagram illustrating transmittance and spectral intensity at a first output of the short pulse laser resonator of FIG. 3 (or FIG. 4)

In FIG. 5, there is shown a diagram illustrating the spectral intensity (=average mode-locked power/bandwidth (FWHM)) in arbitrary units (in full lines) as well as the transmittance in % (in broken lines) with respect to the first outcoupler mirror OC1 of FIG. 3 or 4, that is at the output 3. As already mentioned, a portion of 5% of the laser radiation is coupled out here, and the specifically selected outcoupler mirror OC1 has a transmittance characteristic where the wavelengths at the wings of the spectral band are accentuated, that means there is higher transmittance, for instance at wavelengths between 600 and 700 nm and between 900 and 1000 nm as in the range of 700-900 nm (center of the spectrum). Accordingly, when compared to the diagram of FIG. 6 referring to the second outcoupler mirror OC2, a relatively broad bandwidth of the laser radiation coupled out at this first outcoupler mirror OC1 is obtained, for instance with a bandwidth of 670-900 nm at a 0.5 intensity, as shown in FIG. 5, i.e. at an intensity corresponding to the full width half maximum (FWHM): The full width at half maximum (FWHM) is a parameter commonly used to describe the width of a "bump" on a curve or function. It is given by the distance between points on the curve at which the function reaches half its maximum value.

Figure 6:
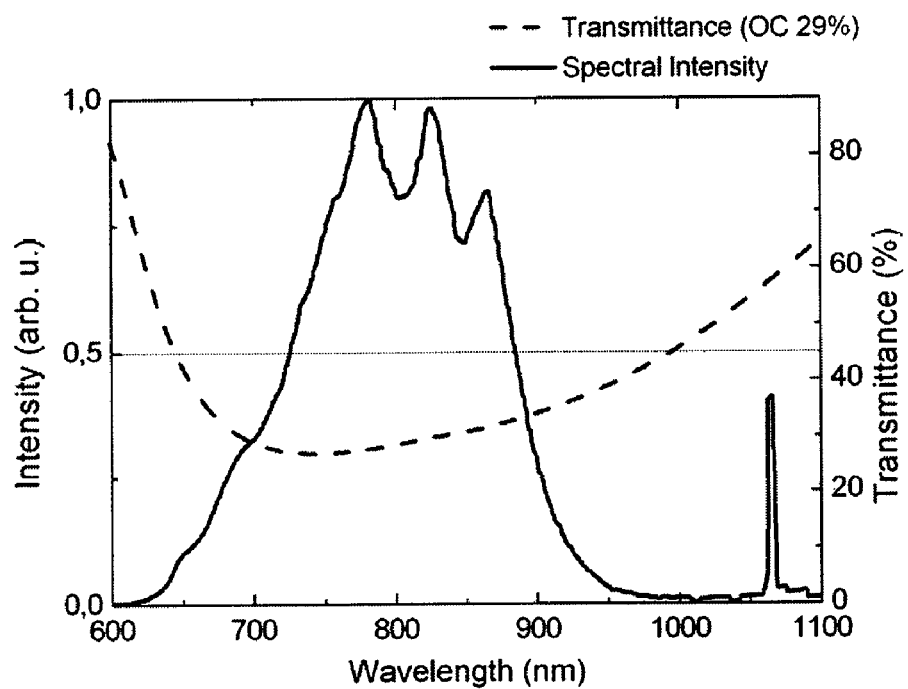
FIG. 6 shows another diagram illustrating transmittance and spectral intensity at a second output of the laser resonator of FIG. 3 (or FIG. 4)

Contrary to this, the second outcoupler mirror OC2 has, according to FIG. 6, a transmittance (shown in broken lines again) which does not enhance the wings of the spectral band in such manner as the first end mirror OC1 (s. FIG. 5), although the second outcoupler mirror OC2 has a higher overall transmittance in the interesting wavelength band from, for instance, 700-900 nm. Accordingly, at the line characterizing a spectral intensity of 0.5 (FWHM), the radiation transmitted via the second outcoupler mirror OC2 has a rather narrow bandwidth of about 725-880 nm, when compared with the bandwidth of mirror OC1, FIG. 5. As already mentioned above, this second outcoupler mirror OC2 provides an out-coupling factor of 29%.

Figure 7:
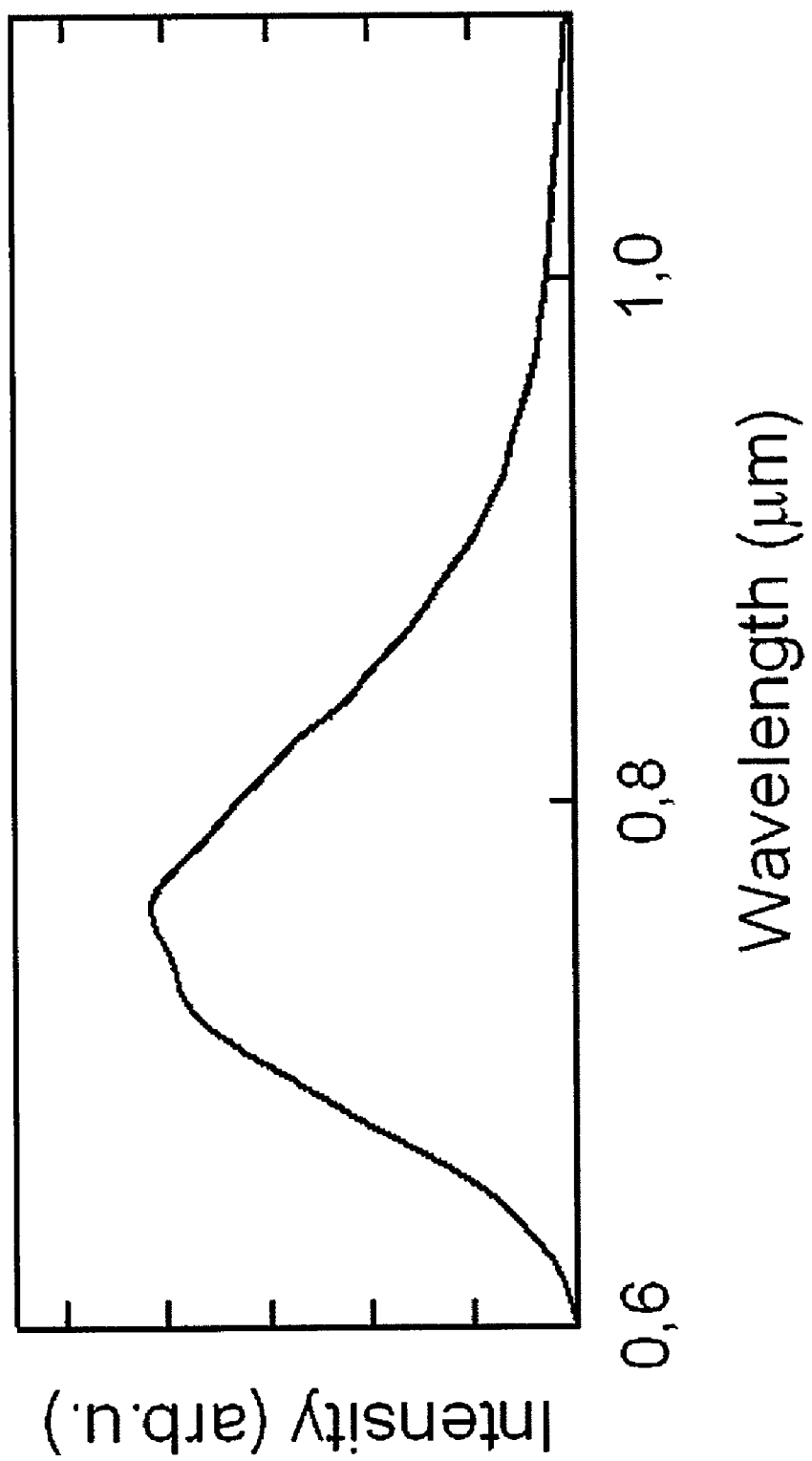
FIG. 7 illustrates the amplification characteristic of a typical laser crystal used for the laser resonator, for instance a Ti:Sapphire crystal, that is the intensity (in arbitrary units) versus the wavelength (in μm).

To further illustrate the principle spectrum of the laser radiation obtained with a resonator, as the femtosecond resonator 2 according to FIG. 3, FIG. 7 shows the intensity (in arbitrary units) of the laser radiation versus the wavelength (in μm) with a center wavelength at about 0.8 μm (800 nm) and with respective slopes in the range of 600-750 nm (increasing slope) and in the range of 780-1000 nm (decreasing slope). When combining this intensity characteristic with the transmittance characteristics of FIG. 3 or 4, with a more or less accentuation of wavelengths in the wings of the spectrum, the obtained spectra as shown in FIG. 5 and 6 will be clear.

It should be mentioned that the CEP device 7 could be configured in the manner as disclosed in WO 2006/008135 A2 (and the corresponding U.S. patent application Ser. No. 11/572312), namely with optical DFG means 8 comprising, for instance, a non-linear optical medium, as e.g. a periodically poled magnesium oxide-doped lithium niobate; the phase locking means 9 may include a light-sensitive device, as a photodiode, as further disclosed in this WO 2006/008135 A2, the contents of which being included herein by reference. On the other hand, the interferometer means 8' of FIG. 3 may be configured as principally shown in U.S. Pat. No. 6,724,788 B1, the contents of which being also incorporated herein by reference, compare also the introduction part of WO 2006/008135 A2, as well as Rüdiger Paschotta, "Frequenzkämme und optische Frequenzmetrologie" (Frequency combs and optical frequency metrology), Optische Messtechnik, Photonik 3/2006, p. 60-63.

For the difference frequency generation, laser radiation with broad bandwidth is advantageous, whereas a lower power of the radiation is sufficient; on the other hand, a greater portion (29% for instance) of the radiation is coupled out at the second end mirror OC2 for seeding the femtosecond laser amplifier 5, and here, a narrower bandwidth is better matched to the limited bandwidth of such an amplifier. On the other hand, more spectral density (higher power at limited bandwidth) improves the contrast between pulse and background of such amplifiers.

In the foregoing, the invention has been described with reference to particular, preferred embodiments; however, it will be appreciated that various changes and modifications could be provided by a person skilled in the art without departing from the spirit and scope of the present invention, in particular as defined by the appended claims. So, for instance, other values for the transmission percentages at the OC mirrors, as well as for the spectral densities etc. could be chosen, depending on the respective application of the present subject matter. Moreover, it could be conceivable to provide at least one further mirror as outcoupler mirror, if suitable or necessary, in particular in view of the perfect synchronism of the outputted pulses. So, e.g. with respect to FIG. 3 or 4, respectively, also mirror M2 could be used as further outcoupler mirror.

The invention claimed is:

1. A mode-locked short pulse laser resonator including a pump laser beam input arrangement, a laser medium, and beam outcoupler means, wherein said outcoupler means comprise at least a first outcoupler mirror and a second outcoupler mirror, wherein the first outcoupler mirror has a first multilayer structure and the second outcoupler mirror has a second multilayer structure, wherein the first multilayer structure of the first outcoupler mirror is arranged for coupling out a first portion of laser radiation incident on the first outcoupler mirror, the first portion of the laser radiation having a first spectral bandwidth, and the first multilayer structure of the first outcoupler mirror is arranged for reflecting a second portion of the laser radiation incident on the first outcoupler mirror, wherein the second multilayer structure of the second outcoupler mirror is arranged for coupling out a third portion of laser radiation incident on the second outcoupler mirror, the third portion of the laser radiation having a second spectral bandwidth, and the second multilayer structure of the second outcoupler mirror is arranged for reflecting a fourth portion of the laser radiation incident on the second outcoupler mirror, wherein the first outcoupler mirror and the second outcoupler mirror are resonator mirrors, the first portion of the laser radiation coupled out by the first outcoupler mirror being a first output of the laser resonator and the third portion of the laser radiation coupled out by the second outcoupler mirror being a second output of the laser resonator, wherein the second portion of the laser radiation reflected from the first outcoupler mirror is reflected back into the laser resonator and the fourth portion of the laser radiation reflected from the second outcoupler mirror is reflected back into the laser resonator, and wherein the first spectral bandwidth is broader than the second spectral bandwidth.

2. The mode-locked short pulse laser resonator of claim 1, wherein the first outcoupler mirror defines an output which is arranged to be coupled to a carrier envelope phase (CEP) stabilization device for the mode-locked short pulse laser oscillator.

3. The mode-locked short pulse laser resonator of claim 2, wherein the first outcoupler mirror defines an output which is arranged to be coupled to difference frequency generator means of the CEP stabilization device.

4. The mode-locked short pulse laser resonator of claim 2, wherein the first outcoupler mirror defines an output which is arranged to be coupled to f:2f interferometer means of the CEP stabilization device.

5. The mode-locked short pulse laser resonator of claim 1, wherein the first outcoupler mirror is arranged for coupling out laser radiation of relatively low spectral density.

6. The mode-locked short pulse laser resonator of claim 5, wherein the laser radiation coupled out via the first outcoupler mirror has a spectral density of less than 1 mW/nm.

7. The mode-locked short pulse laser resonator of claim 1, wherein the first outcoupler mirror is arranged for coupling out laser radiation of relatively low spectral density.

8. The mode-locked short pulse laser resonator of claim 7, wherein the laser radiation coupled out via the first outcoupler mirror has a spectral density of less than 1 mW/nm.

9. The mode-locked short pulse laser resonator of claim 1, wherein the second outcoupler mirror defines an output which is arranged to be coupled to a laser amplifier.

10. The mode-locked short pulse laser resonator of claim 1, wherein the second outcoupler mirror is arranged for coupling out laser radiation of relatively high spectral density.

11. The mode-locked short pulse laser resonator of claim 10, wherein the laser radiation coupled out via the second outcoupler mirror has a spectral density of more than 1 mW/nm.

12. The mode-locked short pulse laser resonator of claim 1, wherein the second outcoupler mirror is arranged for coupling out laser radiation of relatively high spectral density.

13. The mode-locked short pulse laser resonator of claim 12, wherein the laser radiation coupled out via the second outcoupler mirror has a spectral density of more than 1 mW/nm.

14. A short pulse laser arrangement including a mode-locked short pulse laser resonator, a pump laser for supplying a pump laser radiation to the short pulse laser resonator, a carrier envelope phase (CEP) stabilization device coupled to the short pulse laser resonator for phase locking the laser radiation, said short pulse laser resonator having at least a first outcoupler mirror and a second outcoupler mirror, wherein the first outcoupler mirror has a first multilayer structure and the second outcoupler mirror has a second multilayer structure, wherein the first multilayer structure of the first outcoupler mirror is arranged for coupling out a first portion of laser radiation incident on the first outcoupler mirror, the first portion of the laser radiation having a first spectral bandwidth, and the first multilayer structure of the first outcoupler mirror is arranged for reflecting a second portion of the laser radiation incident on the first outcoupler mirror, wherein the second multilayer structure of the second outcoupler mirror is arranged for coupling out a third portion of laser radiation incident on the second outcoupler mirror, the third portion of the laser radiation having a second spectral bandwidth, and the second multilayer structure of the second outcoupler mirror is arranged for reflecting a fourth portion of the laser radiation incident on the second outcoupler mirror, wherein the first outcoupler mirror and the second outcoupler mirror are resonator mirrors, the first portion of the laser radiation coupled out by the first outcoupler mirror being a first output of the laser resonator and the third portion of the laser radiation coupled out by the second outcoupler mirror being a second output of the laser resonator, wherein the second portion of the laser radiation reflected from the first outcoupler mirror is reflected back into the laser resonator and the fourth portion of the laser radiation reflected from the second outcoupler mirror is reflected back into the laser resonator, wherein the first spectral bandwidth is broader than the second spectral bandwidth, and wherein the first output is arranged to be coupled to the CEP stabilization device for the mode-locked short pulse laser oscillator.

15. The short pulse laser arrangement of claim 14, wherein the CEP stabilization device comprises difference frequency generator means coupled to the first outcoupler mirror.

16. The short pulse laser arrangement of claim 14, wherein the first outcoupler mirror is arranged to supply a laser radiation of relatively low spectral density to the difference frequency generator means.

17. The short pulse laser arrangement of claim 14, wherein the second outcoupler mirror output is coupled to a laser amplifier.

18. The short pulse laser arrangement of claim 16, wherein the second outcoupler mirror is arranged for coupling out laser radiation of relatively high spectral density.

19. The short pulse laser arrangement of claim 17, wherein the second outcoupler mirror is arranged for coupling out laser radiation of relatively high spectral density.

* * * * *